US 6,713,148 B1

United States Patent
Hsu et al.

(10) Patent No.: US 6,713,148 B1
(45) Date of Patent: Mar. 30, 2004

(54) OPTICAL INFORMATION RECORDING MEDIUM

(75) Inventors: Wei-Chih Hsu, NanTou (TW);
Shun-Te Chang, Yunanlin (TW);
Song-Yeu Tsai, Taipei (TW);
Mei-Rurng Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 7 days.

(21) Appl. No.: 10/265,684

(22) Filed: Oct. 8, 2002

(51) Int. Cl.$^7$ ................................................ B32B 3/02
(52) U.S. Cl. ..................... 428/64.1; 428/64.5; 428/64.6; 430/270.13
(58) Field of Search ............................ 428/64.1, 64.4, 428/64.5, 64.6, 913; 430/270.13, 495.1, 945

(56) References Cited

U.S. PATENT DOCUMENTS 6,153,063 A * 11/2000 Yamada et al. ........ 204/192.22

* cited by examiner

*Primary Examiner*—Elizabeth Mulvaney
(74) *Attorney, Agent, or Firm*—Bacon & Thomas, PLLC (57) ABSTRACT

An optical information recording composition suitable for use as a recording layer of an optical information recording medium. The optical information recording composition contains Sb, and one or two elements selected from N and O, and optionally one or more elements M selected from Ge, Te, Bi, Sn, Ag, Au, In, Pb, Pd, Pt, Al, Si, Ti, V, Cr, Mn, Fe, Co, Ni, Cu, Zn, Ta, Ga, Zr, Nb, Mo, Ru, Rh, Hf, W, Re, Os, Ir, Dy and Th. A light beam having a wavelength of 200–800 nm can be used to record information on the optical information recording medium and retrieve information therefrom.

20 Claims, 7 Drawing Sheets

OPTICAL INFORMATION RECORDING MEDIUM

FIELD OF THE INVENTION

The present invention relates to an optical information recording medium for recording and retrieving said information, and particularly to an inorganic optical information recording composition as a recording layer of said optical information recording medium.

BACKGROUND OF THE INVENTION

The recording layer materials for recordable optical recording disks currently available on the market mainly are cyanine dyes, phthalocyanine dyes, and azo dyes. The synthesis and purification of these organic dyes require complicated steps and the production costs thereof are thus relatively high.

The pursuit of a higher recording density is a trend of development for a recordable optical recording disk. Along with the development of the recording density, the recording mark will become smaller, and the selection of the material for the recording layer will be more stringent. In particular, there are very few organic dyes available for use as a recording layer material in short wavelength laser (e.g. 405 nm blue laser) and high speed recording (>2X DVD) applications. To the knowledge of the inventors of the present invention, there is only one novel organic dye responsive to the blue light, which is published by Sony Co. of Japan in the ISOM Conference in 2001 [T. Iwamura et al., Technical Digest of Intrnational Symposium on Optical Memory 2001, p218–219]. Sony Co. proposes a vacuum evaporation process for forming a HD-DVD-R organic dye recording layer instead of the spin coating process conventionally used in mass production by the optical recording disk factories. The reason is that the track pitch of a high density HD-DVD-R is about one half of that of a low density DVD-R optical recording disk. If the spin coating process is used, the deep grooves on the substrate cannot be completely filled with the dye. However, the evaporation process still requires more studies to be put into mass production with comparable cost.

The use of an inorganic material as a recording layer material for a recordable optical recording disk has been disclosed in U.S. Pat. No. 5,334,433, 6,229,785B1 and US2002/0022105A1. The Te-O-Pd recording layer material disclosed by Matsushita Co in U.S. Pat. No. 6,229,785B1 and US2002/0022105A1 possesses a relatively greater commercial potential. When the inorganic material is used to form the recording layer, one advantage among others is the vacuum sputtering process currently used by the optical recording disk factories is applicable. The vacuum sputtering process uses less man-power, is more friendly to the environment, and is easier to control the film quality. To realize the production of a high-density, high-speed, and multi-recording-layer optical recording disk, an inorganic material is more feasible than an organic material as a recording layer material.

SUMMARY OF THE INVENTION

One objective of the present invention is to provide a novel inorganic optical information recording composition, so that an optical information recording medium manufacturer has another option to choose a recording layer material.

Another objective of the present invention is to provide an optical information recording medium with a high speed and a high recording density, while having an excellent recording and reading properties such as a high carrier-to-noise ratio (CNR) and a low jitter.

The present invention uses inorganic Sb—N or Sb—N—M (N-containing series), Sb—O or Sb—O—M (O-containing series), or Sb—N—O or Sb—N—O—M (N/O-containing series) as a recording layer material for a recordable optical recording disk, wherein M is one or more elements selected from Ge, Te, Bi, Sn, Ag, Au, In, Pb, Pd, Pt, Al, Si, Ti, V, Cr, Mn, Fe, Co, Ni, Cu, Zn, Ta, Ga, Zr, Nb, Mo, Ru, Rh, Hf, W, Re, Os, Ir, Dy, Tb. A high density recordable optical recording disk can be produced by sputtering such a material on a transparent substrate having annular-grooved tracks, and sputtering a metallic reflective layer and a protective layer thereon. A reactive sputtering can be used to form the recording layer material of the present invention, wherein a target used is made of Sb element or an Sb alloy thereof, Sb—M. During sputtering of the recording layer, argon and nitrogen (or argon and oxygen; or argon, nitrogen and oxygen) are introduced into the reaction chamber at the same time, wherein a DC- or RF-sputtering is used. The composition and thickness of the recording layer can be controlled so that said recording layer has a sufficient absorption in the ultraviolet region, the blue-violet region, or the visible region, such that a light beam with a wavelength of 200–800 nm can be used to record and retrieve information.

BRIEF DESCRIPTION OF THE DRAWINGS

FIG. 1 (A) is a schematic cross-sectional view of a structure of an optical information recording disk according to a first preferred embodiment of the present invention;

FIG. 1 (B) is a schematic cross-sectional view of a structure of an optical information recording disk according to a second preferred embodiment of the present invention;

FIG. 1 (C) is a schematic cross-sectional view of a structure of an optical information recording disk according to a third preferred embodiment of the present invention;

FIG. 1 (D) is a schematic cross-sectional view of a structure of an optical information recording disk according to a fourth preferred embodiment of the present invention;

DETAILED DESCRIPTION OF THE INVENTION

The present invention provides an optical information recording medium having good recording and reading properties. For example, a laser beam with a low wavelength can be used to record a mark length smaller than 250 nm with a wide writing power margin, thereby realizing a high-speed, high-recording-density optical recording disk while obtaining an excellent carrier-to-noise ratio (CNR), a low jitter, and a reliable reading characteristic.

Preferred embodiments of the present invention are as follows:

1. An optical information recording medium comprising a layer of an optical information recording composition, wherein said optical information recording composition comprises Sb and one or two elements selected from the group consisting of N and O, provided that said optical information recording composition is not a composition comprising Te, O and Sb.

2. The optical information recording medium as described in Item 1, wherein said optical information recording composition further comprises one or more element M selected from the group consisting of Ge, Te, Bi, Sn, Ag, Au, In, Pb, Pd, Pt, Al, Si, Ti, V, Cr, Mn, Fe, Co, Ni, Cu, Zn, Ta, Ga, Zr, Nb, Mo, Ru, Rh, Hf, W, Re, Os, Ir, Dy and Th.

3. The optical information recording medium as described in Item 1, wherein said optical information recording composition comprises Sb and N with an atomic ratio of Sb:N ranging from 1:0.01 to 1:1.

4. The optical information recording medium as described in Item 2, wherein said optical information recording composition comprises Sb, N and M with an atomic ratio of Sb:N ranging from 1:0.01 to 1:1, and an atomic ratio of Sb:M ranging from 1:0.01 to 1:1.

5. The optical information recording medium as described in Item 4, wherein said M is Ge, Te, or Ag.

6. The optical information recording medium as described in Item 1, wherein said optical information recording composition comprises Sb, N and O, wherein an atomic ratio of Sb:N is 1:0.01 to 1:1, and an atomic ratio of Sb:O is 1:0.01 to 1:1.

7. The optical information recording medium as described in Item 2, wherein said optical information recording composition comprises Sb, N, O and M, wherein an atomic ratio of Sb:N is 1:0.01 to 1:1, an atomic ratio of Sb:O is 1:0.01 to 1:1, and an atomic ratio of Sb:M is 1:0.01 to 1:1.

8. The optical information recording medium as described in Item 7, wherein said M is Ge, Te, or Ag.

9. The optical information recording medium as described in Item 1, wherein said optical information recording composition comprises Sb and O, wherein an atomic ratio of Sb:O is 1:0.01 to 1:1.

10. The optical information recording medium as described in Item 2, wherein said optical information recording composition comprises Sb, O and M, wherein an atomic ratio of Sb:O is 1:0.01 to 1:1, and an atomic ratio of Sb:M is 1:0.01 to 1:1.

11. The optical information recording medium as described in Item 10, wherein said M is Ge, Te, or Ag.

12. The optical information recording medium as described in Item 1 further comprising a transparent substrate, a reflective layer, and a resin protective layer, wherein said optical information recording composition layer is formed on said substrate, said reflective layer is formed on said optical information recording composition layer, and said resin protective layer is formed on said reflective layer.

13. The optical information recording medium as described in Item 1 fturther comprising a transparent substrate, an under dielectric layer formed on said substrate, a reflective layer, and a resin protective layer, wherein said optical information recording composition layer is formed on said under dielectric layer, said reflective layer is formed on said optical information recording composition layer, and said resin protective layer is formed on said reflective layer.

14. The optical information recording medium as described in Item 1 further comprising a transparent substrate, an upper dielectric layer, a reflective layer, and a resin protective layer, wherein said optical information recording composition layer is formed on said substrate, said upper dielectric layer is formed on said optical information recording composition layer, said reflective layer is formed on said upper dielectric layer, and said resin protective layer is formed on said reflective layer.

15. The optical information recording medium as described in Item 1 further comprising a transparent substrate, an under dielectric layer formed on said substrate, an upper dielectric layer, a reflective layer, and a resin protective layer, wherein said optical information recording composition layer is formed on said under dielectric layer, said upper dielectric layer is formed on said optical information recording composition layer, said reflective layer is formed on said upper dielectric layer, and said resin protective layer is formed on said reflective layer.

16. The optical information recording medium as described in Item 1further comprising a transparent substrate, a reflective layer formed on said substrate, and a transparent cover layer, wherein said optical information recording composition layer is formed on said reflective layer, and said transparent cover layer is formed on said optical information recording composition layer.

17. The optical information recording medium as described in Item 1further comprising a transparent substrate, a reflective layer formed on said substrate, an under dielectric layer, and a transparent cover layer, wherein said optical information recording composition layer is formed on said reflective layer, said under dielectric layer is formed on said optical information recording composition layer, and said transparent cover layer is formed on said under dielectric layer.

18. The optical information recording medium as described in Item 1further comprising a transparent substrate, a reflective layer formed on said substrate, an upper dielectric layer formed on said reflective layer, and a transparent cover layer, wherein said optical information recording composition layer is formed on said upper dielectric layer, and said transparent cover layer is formed on said optical information recording composition layer.

19. The optical information recording medium as described in Item 1further comprising a transparent substrate, a reflective layer formed on said substrate, an upper dielectric layer formed on said reflective layer, an under dielectric layer, and a transparent cover layer, wherein said optical information recording composition layer is formed on said upper dielectric layer, said under dielectric layer is formed on said optical information recording composition layer, and said transparent cover layer is formed on said under dielectric layer.

20. The optical information recording medium as described in Item 1, wherein a light beam with a wavelength of 200–800 nm is used to record information on said optical information recording medium, and retrieve said information from said optical information recording medium.

Figure 1:
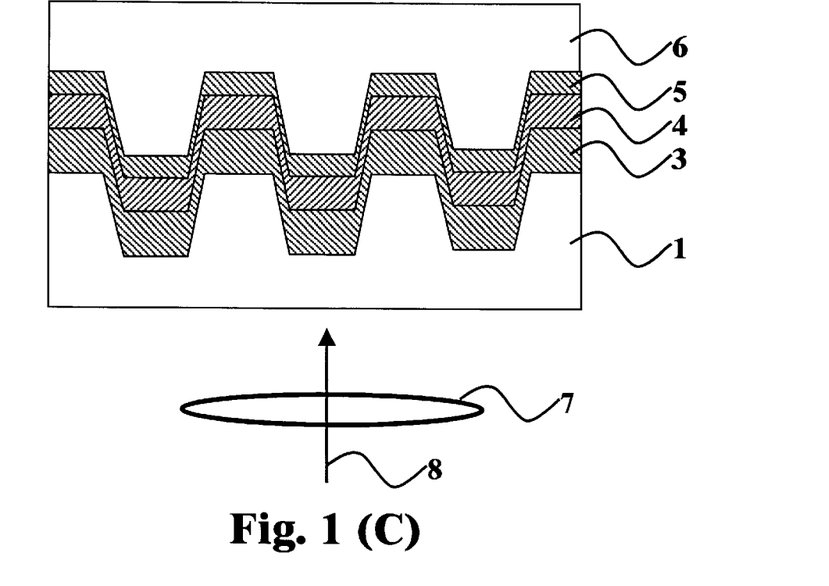
Figure 1A:
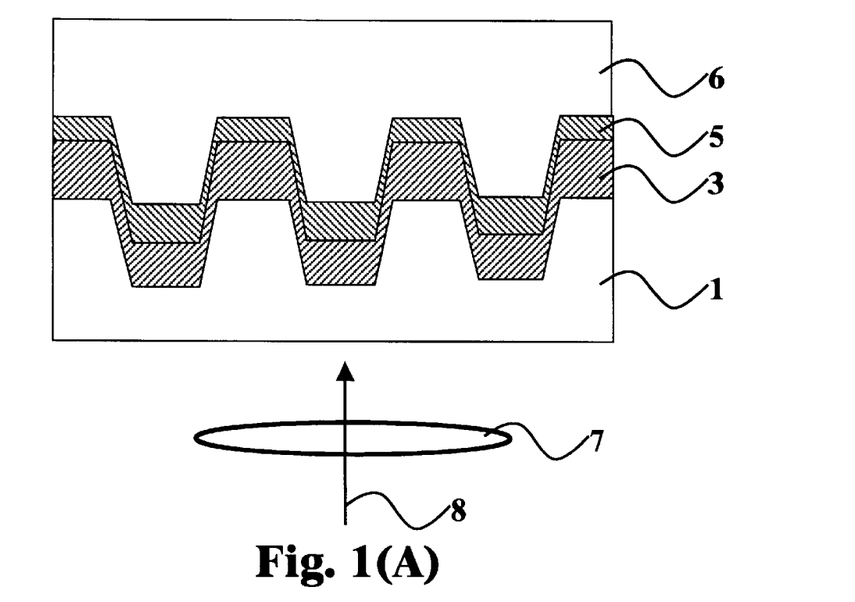

The structure and the material of each layer of an optical information recording medium according to the present invention include, but not limit to, the following:

(a) As shown in FIG. 1(A), the optical information recording disk sequentially comprises a polycarbonate (PC) substrate 1/a recording layer 3/a reflective layer 5/a resin protective layer (UV curable resin) 6. The material of said recording layer 3 can be Sb—N or Sb—N—M, the N-containing material series, or Sb—O or Sb—O—M, the O-containing material series, or Sb—N—O or Sb—N—O—M, the N/O-containing material series, wherein M is one or more elements selected from Ge, Te, Bi, Sn, Ag, Au, In, Pb, Pd, Pt, Al, Si, Ti, V, Cr, Mn, Fe, Co, Ni, Cu, Zn, Ta, Ga, Zr, Nb, Mo, Ru, Rh, Hf, W, Re, Os, Ir, Dy, Tb. The reflective layer material can be Au, Ag, Cu, Al or an alloy thereof. The wavelength of the light beam 8 can be red (wavelength=780 nm, 650 nm or 635 nm), blue-violet (wavelength=400~500 nm) or ultraviolet (wavelength=190~400 nm), and the numerical aperture of the optical focal lens 7 can be 0.45~0.65.

Figure 1B:
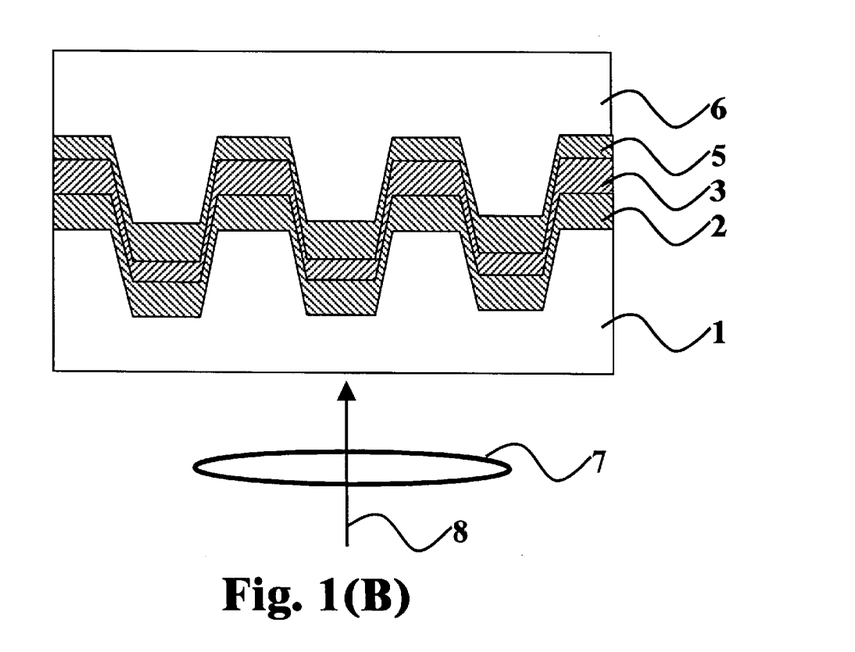

(b) As shown in FIG. 1(B), the optical recording disk sequentially comprises a PC substrate 1/an under dielectric layer 2/a recording layer 3/a reflective layer 5/a resin protective layer 6. The material of said under dielectric layer 2 can be a dielectric material such as $ZnS—SiO_2$, $SiN_x$, AlNx, TaOx or $SiO_2$, etc. The material of the recording layer 3, the material of the reflective layer 5, the wavelength of the light beam 8, and the numerical aperture of the optical focus lens 7 can all be the same as in (a).

(c) As shown in FIG. 1 (C), the optical recording disk sequentially comprises a PC substrate 1/a recording layer 3/an upper dielectric layer 4/a reflective layer 5/a resin protective layer 6. The material of said upper dielectric layer 4 can be a dielectric material such as $ZnS—SiO_2$, $SiN_x$, AlNx, TaOx or $SiO_2$, etc. The material of the recording layer 3, the material of the reflective layer 5, the wavelength of the light beam 8, and the numerical aperture of the optical focus lens 7 can all be the same as in (a).

Figure 1D:
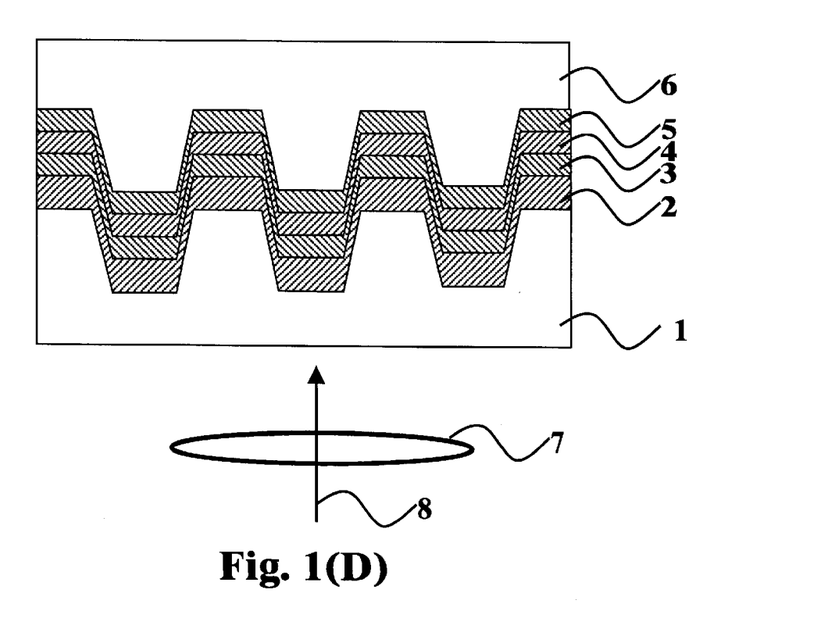

(d) As shown in FIG. 1 (D), the optical recording disk sequentially comprises a PC substrate 1/an under dielectric layer 2/a recording layer 3/an upper dielectric layer 4/a reflective layer 5/a resin protective layer 6. The material of said under dielectric layer 2 and said upper dielectric layer 4 can be a dielectric material such as $ZnS—SiO_2$, $SiN_x$, AlNx, TaOx or $SiO_2$, etc. The material of the recording layer 3, the material of the reflective layer 5, the wavelength of the light beam 8, and the numerical aperture of the optical focus lens 7 can all be the same as in (a).

Figure 2:
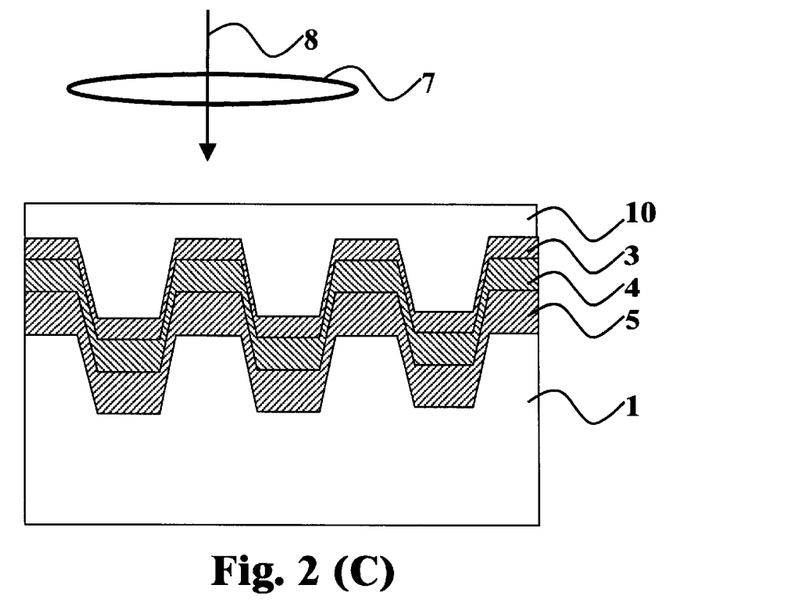
FIG. 2(A) is a schematic cross-sectional view of a structure of an optical information recording disk according to a fifth preferred embodiment of the present invention.
FIG. 2(B) is a schematic cross-sectional view of a structure of an optical information recording disk according to a sixth preferred embodiment of the present invention.
FIG. 2(C) is a schematic cross-sectional view of a structure of an optical information recording disk according to a seventh preferred embodiment of the present invention.
FIG. 2(D) is a schematic cross-sectional view of a structure of an optical information recording disk according to an eighth preferred embodiment of the present invention.
Figure 2A:
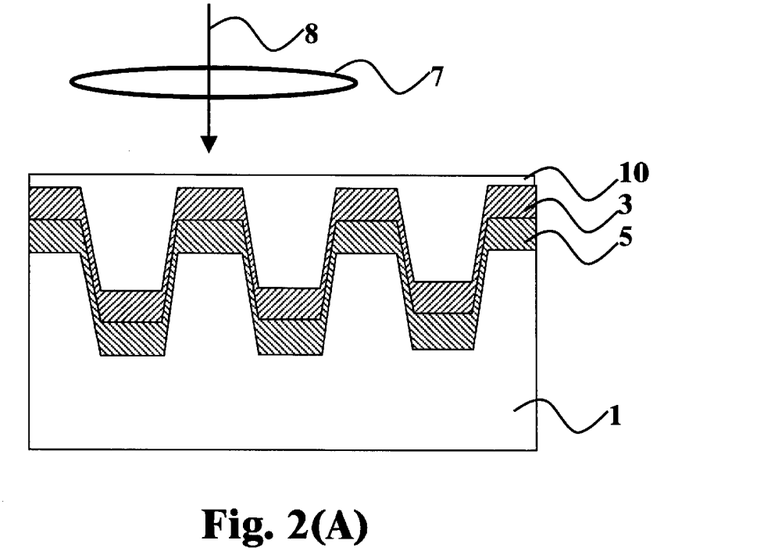

(e) As shown in FIG. 2(A), the optical recording disk sequentially comprises a PC substrate 1/a reflective layer 5/a recording layer 3/a transparent cover layer 10. The material of said transparent cover layer 10 can be polycarbonate or poly(methyl methacrylate) (PMMA). The material of the recording layer 3, the material of the reflective layer 5, and the wavelength of the light beam 8 can all be the same as in (a). The numerical aperture of the optical focus lens 7 can be 0.75–0.95.

Figure 2B:
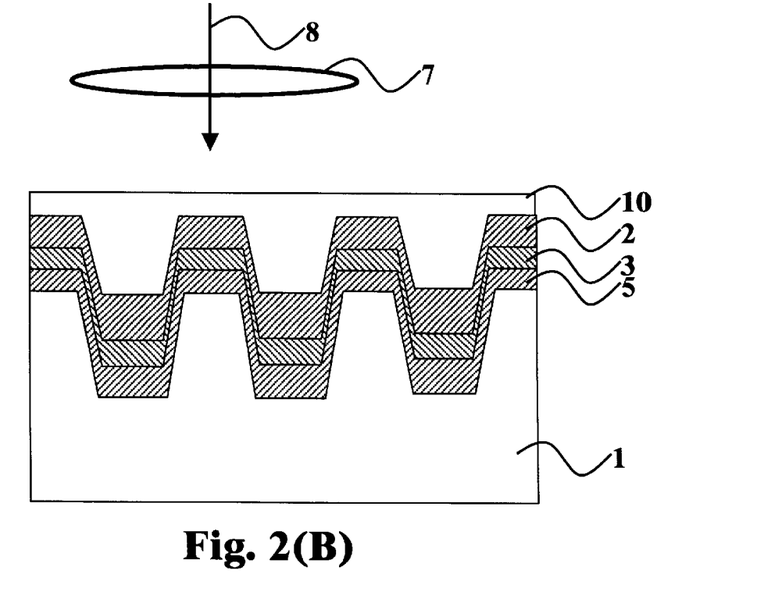

(f) As shown in FIG. 2(B), the optical recording disk sequentially comprises a PC substrate 1/a reflective layer 5/a recording layer 3/an under dielectric layer 2/a transparent cover layer 10. The material of said under dielectric layer 2 can be a dielectric material such as $ZnS—SiO_2$, $SiN_x$, AlNx, TaOx or $SiO_2$, etc. The material of the recording layer 3, the material of the reflective layer 5, the material of the transparent cover layer 10, the wavelength of the light beam 8, and the numerical aperture of the optical focus lens 7 can all be the same as in (e).

(g) As shown in FIG. 2(C), the optical recording disk sequentially comprises a PC substrate 1/a reflective layer 5/an upper dielectric layer 4/a recording layer 3/a transparent cover layer 10. The material of said upper dielectric layer 4 can be a dielectric material such as $ZnS—SiO_2$, $SiN_x$, AlNx, TaOx or $SiO_2$, etc. The material of the recording layer 3, the material of the reflective layer 5, the material of the transparent cover layer 10, the wavelength of the light beam 8, and the numerical aperture of the optical focus lens 7 can all be the same as in (e).

Figure 2D:
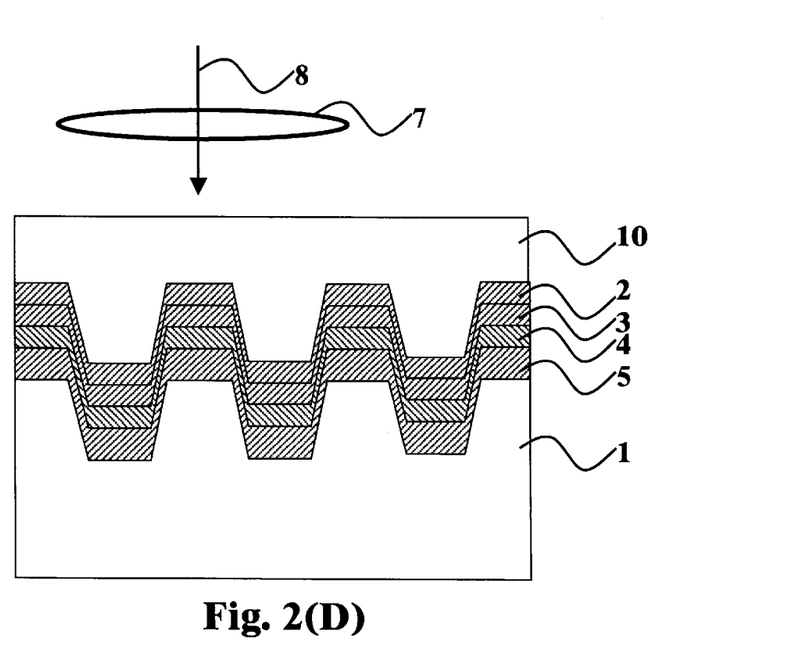

(h) As shown in FIG. 2(D), the optical recording disk sequentially comprises a PC substrate 1/a reflective layer 5/an upper dielectric layer 4/a recording layer 3/an under dielectric layer 2/a transparent cover layer 10. The material of said under dielectric layer 2 and said upper dielectric layer 4 can be a dielectric material such as $ZnS—SiO_2$, $SiN_x$, AlNx, TaOx or $SiO_2$, etc. The material of the recording layer 3, the material of the reflective layer 5, the material of the transparent cover layer 10, the wavelength of the light beam 8, and the numerical aperture of the optical focus lens 7 can all be the same as in (e).

EXAMPLE 1

PC substrate (0.6 mm)/Sb—N (28 nm)/Ag (90 nm)/UV curable resin (500 nm)/blank PC substrate (0.6 mm)

Preparation of disk: A RF-sputtering process was used to produce a recording layer SbNx on a PC substrate under the following conditions: background vacuum: $5 \times 10^{-6}$ torr, chamber pressure: 3 mtorr, and argon and nitrogen being introduced into the chamber with a flow rate ratio of $N_2/Ar=1$. Sb was used as the sputtering target. The film thickness was accurately controlled. The reflective layer Ag was deposited by a RF-sputtering; and a spin-coating process was used to coat a resin protective layer (UV curable resin). Finally, another blank PC substrate was bonded to the resin protective layer. An Alpha-Step Surface Profiler was used to measure the thickness of the recording layer SbNx, and the measured value is 28 nm. An Auger Electron Spectroscopy (AES) was used to analyze the atomic percentages of Sb and N in the recording layer, and the results are 79.6% and 20.4%, respectively.

Testing parameters were: laser wavelength of 405 nm, numerical aperture of focal lens of 0.65, disk constant linear velocity (CLV) of 2.2~12.1 m/s, the recording signals being able to be recorded on the lands or the grooves, the writing power of 5~12 mW, and the reading power of 0.4 mW.

Testing results: The writing speed can reach at least 5.0 times DVD speed, i.e. 55.40 Mbps; and the signal intensity of CNR (carrier-to-noise ratio) is still nearly 55 dB.

EXAMPLE 2

PC substrate (0.6 mm)/$ZnS—SiO_2$ (50 nm)/Sb—N (28 nm)/Ag (90 nm)/UV curable resin (500 nm)/blank PC substrate (0.6 mm)

Preparation of disk: A RF-sputtering process was used to produce a dielectric layer $ZnS—SiO_2$ and the film thickness thereof was accurately controlled. A RF-sputtering process was used to produce a recording layer SbNx on the dielectric layer under the following conditions: background vacuum: $5 \times 10^{-6}$ torr, chamber pressure: 3 mtorr, and argon and nitrogen being introduced into the chamber with a flow rate ratio of $N_2/Ar=1$. Sb was used as the sputtering target. The film thickness was accurately controlled. A RF-sputtering process was used to produce a reflective layer Ag, a spin-coating process was used to coat a resin protective layer (UV curable resin), and another blank PC substrate was bonded to the resin protective layer.

The thickness of the recording layer SbNx is 28 nm, and atomic percentages of Sb and N thereof are 79.6% and 20.4%, respectively, measured by the same methods as in Example 1.

Figure 3:
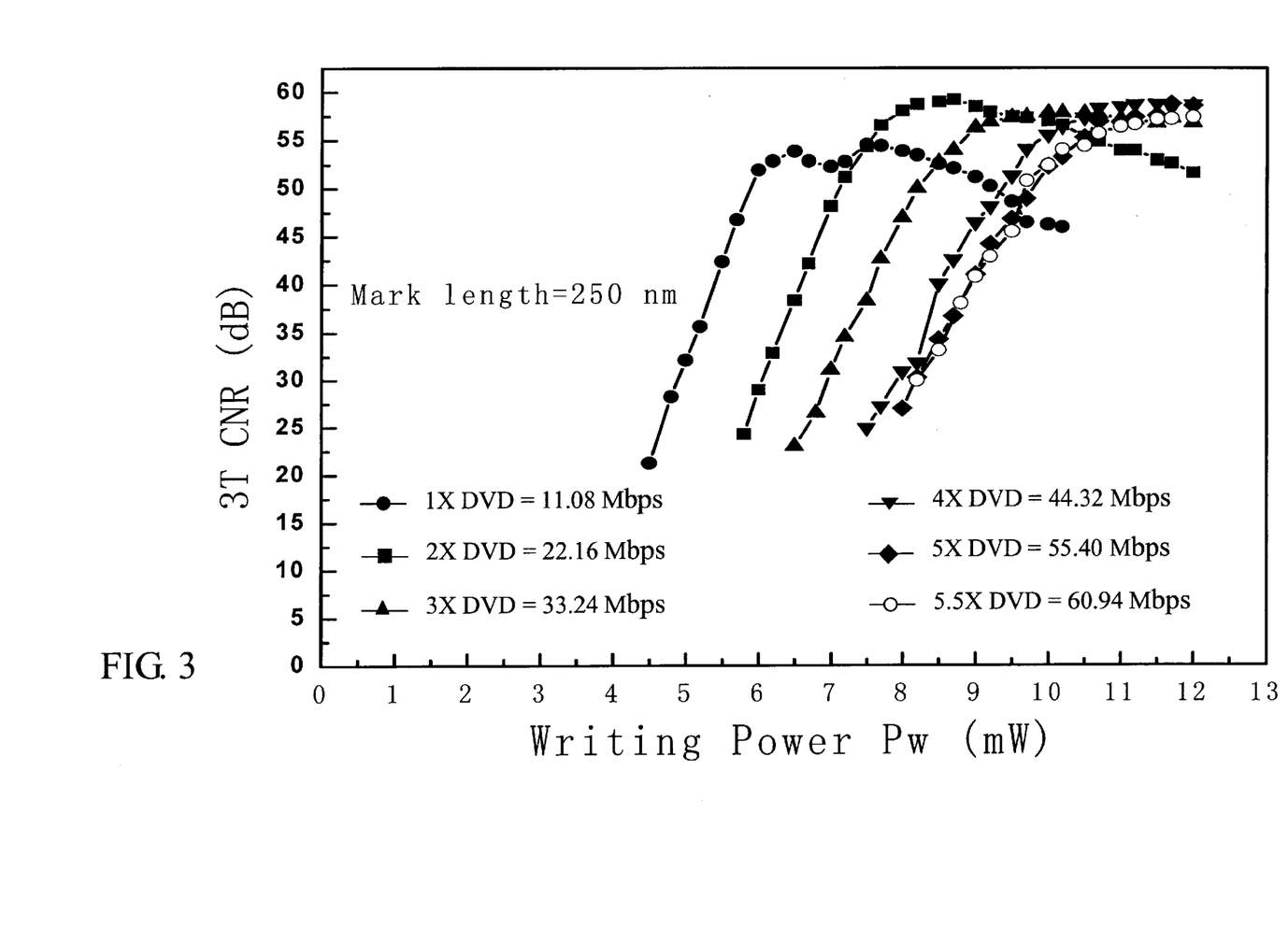
FIG. 3 shows the relationship between the CNR signal intensity and the writing power at different writing speeds of an optical information recording disk prepared in Example 2 of the present invention.

The disk was tested under the same conditions as in Example 1. After the information had been written, the recording signals of 3T (250 nm) and 14T (1167 nm) were read and displayed on an oscillator. The results showed that the disk not only have a sufficient reflectance, but also has a very large (>60%) contrast ratio before and after writing. Moreover, the single frequency signal intensity CNR of 3T and 14T signals is >49 dB. The relationship of the CNR signal intensity and the writing power at different writing speeds is shown in FIG. 3, wherein a different writing speed has a different optimum writing power. The writing speed can reach at least 5.5 times DVD speed, i.e. 60.94 Mbps. The CNR signal intensity is still nearly 60 dB. A written signal of a 4X DVD (data transfer rate, D.T.R.=44.32 Mbps) was read, and the signal read was transmitted through a conventional equalizer, and a time interval analyzer was used to calculate the jitter of the signal, wherein the channel clock of writing was 104.64 MHz, the CLV of the disk was 8.8 m/s, the minimum pit length 3T was 250 nm, and the modulation was about 60%. After analysis, the jitter of the signal is 11.9%~12.28%. Furthermore, the jitters for different writing speeds (1X–5.5X) are within 11.7% to 13.0% by the same analysis.

EXAMPLE 3

PC substrate (0.6 mm)/ZnS—SiO$_2$ (90 nm)/Sb—N (25 nm)/ZnS—SiO$_2$ (20 nm)/Ag (90 nm)/UV curable resin (500 nm)/blank PC substrate (0.6 mm)

The processes in Example 2 were used to prepare the disk of this example, and the methods identical to Example 1 were used to measure the recording layer SbNx. The recording layer SbNx has a thickness of 25 nm, and atomic percentages of Sb and N of 79.6% and 20.4%, respectively.

Conditions identical to Example 1 were used to test the disk. The test results show that the writing speed can reach at least 5.0X DVD, i.e. 55.40 Mbps, and the CNR signal intensity is still nearly 55 dB.

EXAMPLE 4

PC substrate (0.6 mm)/ZnS—SiO$_2$ (60 nm)/Sb—N—Ge (30 nm)/Ag (90 nm)/UV curable resin (500 nm)/blank PC substrate (0.6 mm)

Preparation of disk: A RF-sputtering process was used to produce a recording layer Sb—N—Ge on a dielectric layer ZnS—SiO$_2$ under the following conditions: background vacuum: $5 \times 10^{-6}$ torr, chamber pressure: 3 mtorr, and argon and nitrogen being introduced into the chamber with a flow rate ratio of N$_2$/Ar=1:4. Sb$_{90}$Ge$_{10}$ was used as the sputtering target. The film thickness was accurately controlled. A RF-sputtering process was used to produce the dielectric layer ZnS-SiO$_2$ and the film thickness thereof was accurately controlled. A RF-sputtering process was used to produce a reflective layer Ag, a spin-coating process was used to coat a resin protective layer (UV curable resin), and finally another blank PC substrate was bonded to the resin protective layer. The methods identical to Example 1 were used to measure the recording layer Sb—N—Ge, which has a thickness of 30 nm, and atomic percentages of Sb, N and Ge of 70.4%, 13.1% and 16.5%, respectively.

Figure 4:
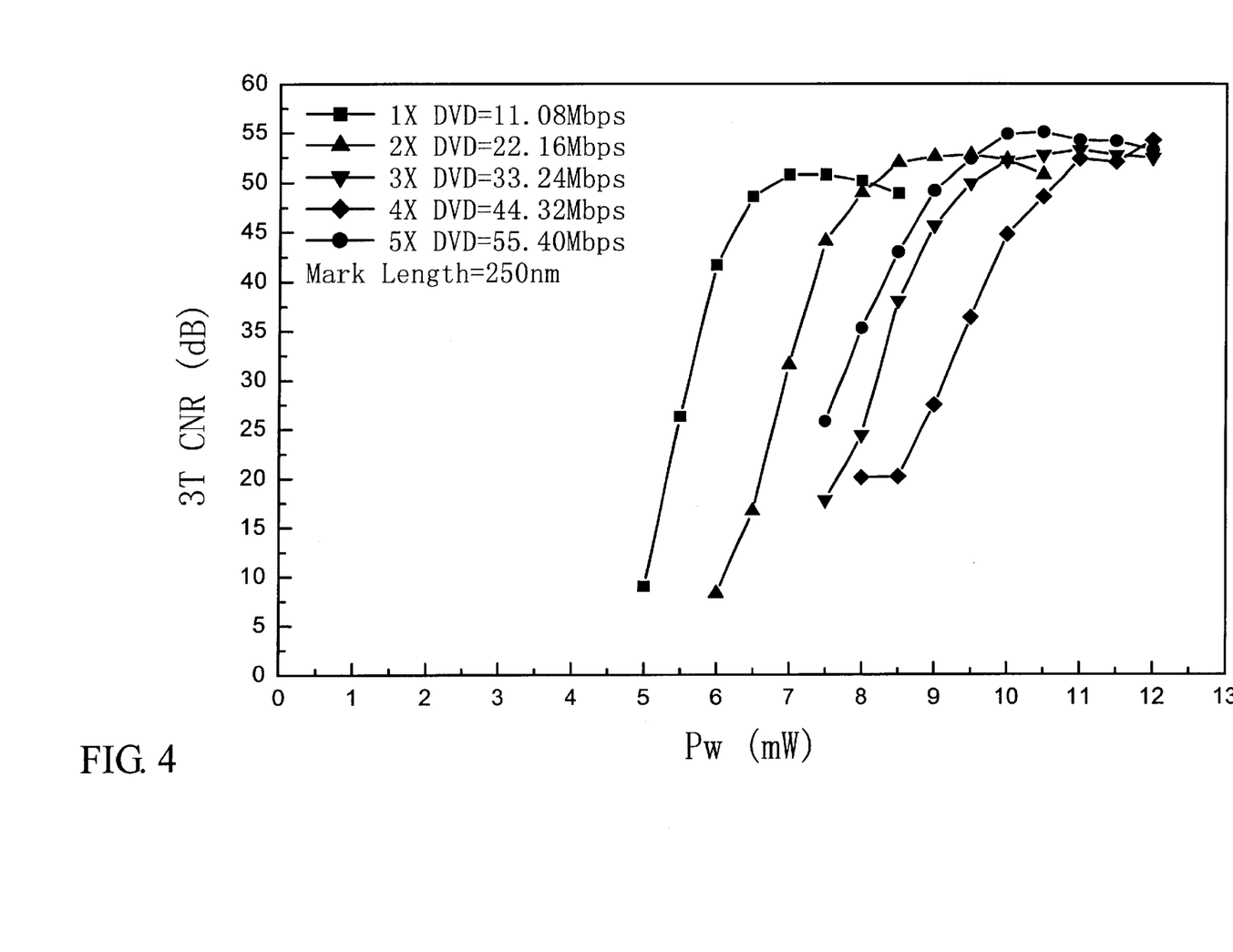
FIG. 4 shows the relationship between the CNR signal intensity and the writing power at different writing speeds of an optical information recording disk prepared in Example 4 of the present invention.

Conditions identical to Example 1 were used to test the disk. The relationship of the CNR signal intensity and the writing power at different writing speeds is shown in FIG. 4, wherein a different writing speed has a different optimum writing power. The writing speed can reach at least 5.0 times DVD speed, i.e. 55.40 Mbps. The CNR signal intensity is still nearly 55 dB.

EXAMPLE 5

PC substrate (0.6 mm)/ZnS—SiO$_2$ (60 nm)/Sb—N—Te (30 nm)/Ag (90 nm)/UV curable resin (500 nm)/blank PC substrate (0.6 mm)

Preparation of disk: A RF-sputtering process was used to produce a recording layer Sb—N—Te on a dielectric layer ZnS—SiO$_2$ under the following conditions: background vacuum: $5 \times 10^{-6}$ torr, chamber pressure: 3 mtorr, and argon and nitrogen being introduced into the chamber with a flow rate ratio of N$_2$/Ar=1. Sb$_{70}$Te$_{30}$ was used as the sputtering target. The film thickness was accurately controlled. A RF-sputtering process was used to produce the dielectric layer ZnS—SiO$_2$ and the film thickness thereof was accurately controlled. A RF-sputtering process was used to produce a reflective layer Ag, a spin-coating process was used to coat a resin protective layer (UV curable resin), and finally another blank PC substrate was bonded to the resin protective layer. The methods identical to Example 1 were used to measure the recording layer Sb—N—Te, which has a thickness of 30 nm, and atomic percentages of Sb, N and Te of 56.4%, 15.4% and 28.2%, respectively.

Figure 5:
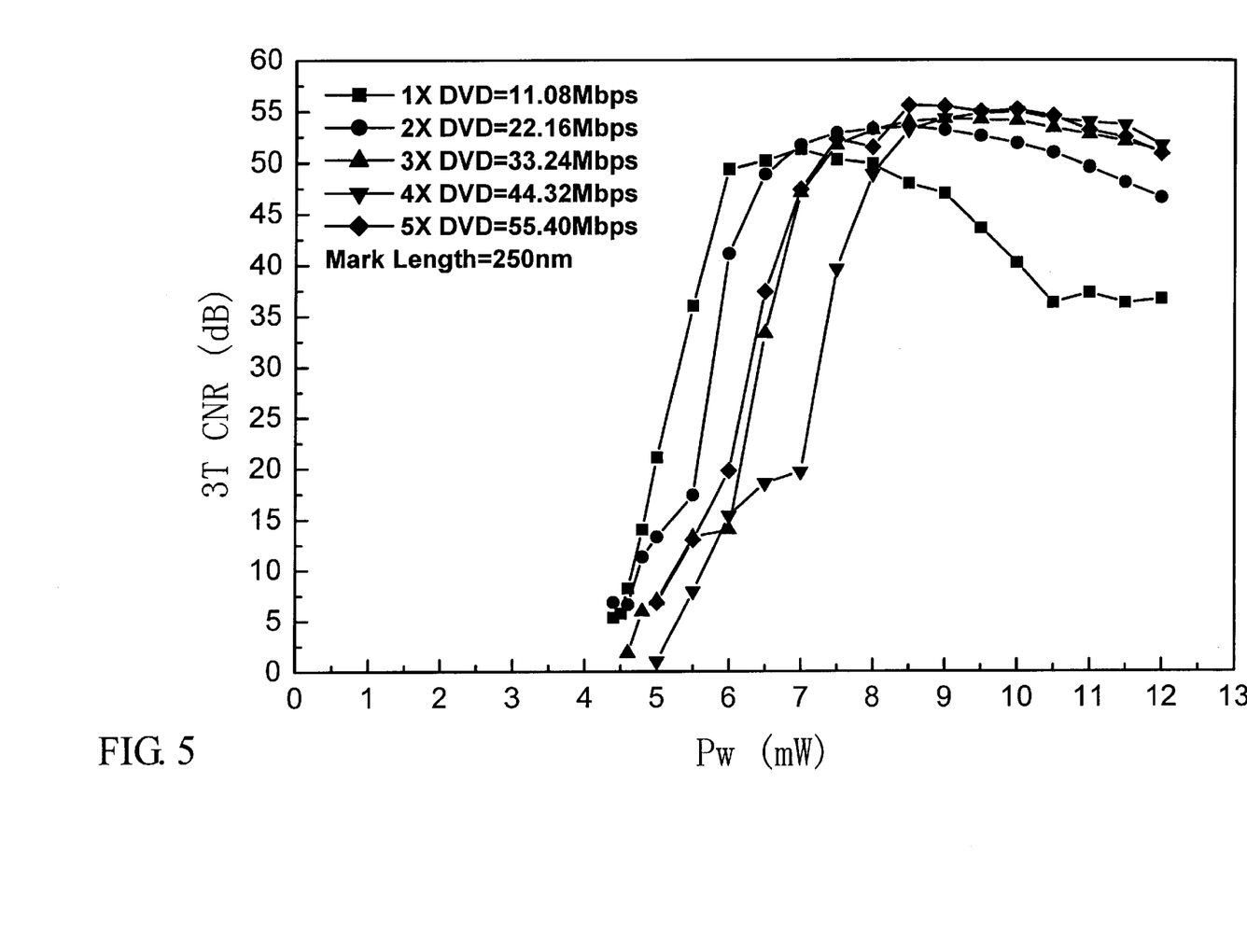
FIG. 5 shows the relationship between the CNR signal intensity and the writing power at different writing speeds of an optical information recording disk prepared in Example 5 of the present invention.

Conditions identical to Example 1 were used to test the disk. The relationship of the CNR signal intensity and the writing power at different writing speeds is shown in FIG. 5, wherein a different writing speed has a different optimum writing power. The writing speed can reach at least 5.0 times DVD speed, i.e. 55.40 Mbps. The CNR signal intensity is still nearly 55 dB.

EXAMPLE 6

PC substrate (0.6 mm)/ZnS—SiO$_2$ (60 nm)/Sb—N—O (30 nm)/Ag (90 nm)/UV curable resin (500 nm)/blank PC substrate(0.6 mm)

Preparation of disk: A RF-sputtering process was used to produce a recording layer Sb—N—O on a dielectric layer ZnS—SiO$_2$ under the following conditions: background vacuum: $5 \times 10^{-6}$ torr, chamber pressure: 3 mtorr, and argon, nitrogen and oxygen being introduced into the chamber with a flow rate ratio of N$_2$:Ar:O$_2$=1:0.5:1. Sb was used as the sputtering target. The film thickness was accurately controlled. A RF-sputtering process was used to produce the dielectric layer ZnS-SiO$_2$ and the film thickness thereof was accurately controlled. A RF-sputtering process was used to produce a reflective layer Ag, a spin-coating process was used to coat a resin protective layer (UV curable resin), and finally another blank PC substrate was bonded to the resin protective layer. The methods identical to Example 1 were used to measure the recording layer Sb—N—O, which has a thickness of 30 nm, and atomic percentages of Sb, N and O of 71.2%, 18.3% and 10.54%, respectively.

Conditions identical to Example 1 were used to test the disk. The test results show that the writing speed can reach at least 5.0 times DVD speed, i.e. 55.40 Mbps. The CNR signal intensity is still nearly 55 dB.

EXAMPLE 7

PC substrate (0.6 mm)/ZnS—SiO$_2$ (60 nm)/Sb—O (30 nm)/Ag (90 nm)/UV curable resin (500 nm)/blank PC substrate (0.6 mm)

Preparation of disk: A RF-sputtering process was used to produce a recording layer Sb—O on a dielectric layer ZnS—SiO$_2$ under the following conditions: background vacuum: 5×10$^{-6}$ torr, chamber pressure: 3 mtorr, and oxygen and argon being introduced into the chamber with a flow rate ratio of O$_2$/Ar=0.2:1. Sb was used as the sputtering target. The film thickness was accurately controlled. A RF-sputtering process was used to produce the dielectric layer ZnS—SiO$_2$ and the film thickness thereof was accurately controlled. A RF-sputtering process was used to produce a reflective layer Ag, a spin-coating process was used to coat a resin protective layer (UV curable resin), and finally another blank PC substrate was bonded to the resin protective layer. The methods identical to Example 1 were used to measure the recording layer Sb—O, which has a thickness of 30 nm, and atomic percentages of Sb and O of 10.8% and 89.2%, respectively.

Conditions identical to Example 1 were used to test the disk. The test results show that the writing speed can reach at least 5.0 times DVD speed, i.e. 55.40 Mbps. The CNR signal intensity is still nearly 52 dB.

EXAMPLE 8

PC substrate (0.6 mm)/ZnS—SiO$_2$ (60 nm)/Sb—O—Ag (30 nm)/Ag (90 nm)/UV curable resin (500 nm)Iblank PC substrate(0.6 mm)

Preparation of disk: A RF-sputtering process was used to produce a recording layer Sb—O—Ag on a dielectric layer ZnS—SiO$_2$ under the following conditions: background vacuum: 5×10$^{-6}$ torr, chamber pressure: 3 mtorr, and oxygen and argon being introduced into the chamber with a flow rate ratio of O$_2$/Ar=0.2:1. Sb$_{70}$Ag$_{30}$ was used as the sputtering target. The film thickness was accurately controlled. A RF-sputtering process was used to produce the dielectric layer ZnS—SiO$_2$ and the film thickness thereof was accurately controlled. A RF-sputtering process was used to produce a reflective layer Ag, a spin-coating process was used to coat a resin protective layer (UV curable resin), and fmally another blank PC substrate was bonded to the resin protective layer. The methods identical to Example 1 were used to measure the recording layer Sb—O—Ag, which has a thickness of 30 nm, and atomic percentages of Sb, O and Ag of 54.2%, 9.6% and 36.2%, respectively.

Conditions identical to Example 1 were used to test the disk. The test results show that the writing speed can reach at least 5.0 times DVD speed, i.e. 55.40 Mbps. The CNR signal intensity is still nearly 53 dB.

What is claimed is:

1. An optical information recording medium comprising a layer of an optical information recording composition, wherein said optical information recording composition comprises Sb and one or two elements selected from the group consisting of N and O, provided that said optical information recording composition is not a composition comprising Te, O and Sb.

2. The optical information recording medium as described in Item 1, wherein said optical information recording composition further comprises one or more element M selected from the group consisting of Ge, Te, Bi, Sn, Ag, Au, In, Pb, Pd, Pt, Al, Si, Ti, V, Cr, Mn, Fe, Co, Ni, Cu, Zn, Ta, Ga, Zr, Nb, Mo, Ru, Rh, Hf, W, Re, Os, Ir, Dy and Th.

3. The optical information recording medium as claimed in claim 1, wherein said optical information recording composition comprises Sb and N with an atomic ratio of Sb:N ranging from 1:0.01 to 1:1.

4. The optical information recording medium as claimed in claim 2, wherein said optical information recording composition comprises Sb, N and M with an atomic ratio of Sb:N ranging from 1:0.01 to 1:1, and an atomic ratio of Sb:M ranging from 1:0.01 to 1:1.

5. The optical information recording medium as claimed in claim 4, wherein said M is Ge, Te, or Ag.

6. The optical information recording medium as claimed in claim 1, wherein said optical information recording composition comprises Sb, N and O, wherein an atomic ratio of Sb:N is 1:0.01 to 1:1, and an atomic ratio of Sb:O is 1:0.01 to 1:1.

7. The optical information recording medium as claimed in claim 2, wherein said optical information recording composition comprises Sb, N, O and M, wherein an atomic ratio of Sb:N is 1:0.01 to 1:1, an atomic ratio of Sb:O is 1:0.01 to 1:1, and an atomic ratio of Sb:M is 1:0.01 to 1:1.

8. The optical information recording medium as claimed in claim 7, wherein said M is Ge, Te, or Ag.

9. The optical information recording medium as claimed in claim 1, wherein said optical information recording composition comprises Sb and O, wherein an atomic ratio of Sb:O is 1:0.01 to 1:1.

10. The optical information recording medium as claimed in claim 2, wherein said optical information recording composition comprises Sb, O and M, wherein an atomic ratio of Sb:O is 1:0.01 to 1:1, and an atomic ratio of Sb:M is 1:0.01 to 1:1.

11. The optical information recording medium as claimed in claim 10, wherein said M is Ge, Te, or Ag.

12. The optical information recording medium as claimed in claim 1 further comprising a transparent substrate, a reflective layer, and a resin protective layer, wherein said optical information recording composition layer is formed on said substrate, said reflective layer is formed on said optical information recording composition layer, and said resin protective layer is formed on said reflective layer.

13. The optical information recording medium as claimed in claim 1 further comprising a transparent substrate, an under dielectric layer formed on said substrate, a reflective layer, and a resin protective layer, wherein said optical information recording composition layer is formed on said under dielectric layer, said reflective layer is formed on said optical information recording composition layer, and said resin protective layer is formed on said reflective layer.

14. The optical information recording medium as claimed in claim 1 further comprising a transparent substrate, an upper dielectric layer, a refletive layer, and a resin protective layer, wherein said optical information recording composition layer is formed on said substrate, said upper dielectric layer is formed on said optical information recording composition layer, said reflective layer is formed on said upper dielectric layer, and said resin protective layer is formed on said reflective layer.

15. The optical information recording medium as claimed in claim 1 further comprising a transparent substrate, an under dielectric layer formed on said substrate, an upper dielectric layer, a reflective layer, and a resin protective layer, wherein said optical information recording composition layer is formed on said under dielectric layer, said upper dielectric layer is formed on said optical information recording composition layer, said reflective layer is formed on said upper dielectric layer, and said resin protective layer is formed on said reflective layer.

16. The optical information recording medium as claimed in claim 1 further comprising a transparent substrate, a reflective layer formed on said substrate, and a transparent cover layer, wherein said optical information recording composition layer is formed on said reflective layer, and said transparent cover layer is formed on said optical information recording composition layer.

17. The optical information recording medium as claimed in claim 1 further comprising a transparent substrate, a reflective layer formed on said substrate, an under dielectric layer, and a transparent cover layer, wherein said optical information recording composition layer is formed on said reflective layer, said under dielectric layer is formed on said optical information recording composition layer, and said transparent cover layer is formed on said under dielectric layer.

18. The optical information recording medium as claimed in claim 1 further comprising a transparent substrate, a reflective layer formed on said substrate, an upper dielectric layer formed on said reflective layer, and a transparent cover layer, wherein said optical information recording composition layer is formed on said upper dielectric layer, and said transparent cover layer is formed on said optical information recording composition layer.

19. The optical information recording medium as claimed in claim 1 further comprising a transparent substrate, a reflective layer formed on said substrate, an upper dielectric layer formed on said reflective layer, an under dielectric layer, and a transparent cover layer, wherein said optical information recording composition layer is formed on said upper dielectric layer, said under dielectric layer is formed on said optical information recording composition layer, and said transparent cover layer is formed on said under dielectric layer.

20. The optical information recording medium as claimed in claim 1, wherein a light beam with a wavelength of 200–800 nm is used to record information on said optical information recording medium, and retrieve said information from said optical information recording medium.

* * * * *

UNITED STATES PATENT AND TRADEMARK OFFICE
CERTIFICATE OF CORRECTION

PATENT NO. : 6,713,148 B1
DATED : March 30, 2004
INVENTOR(S) : Wei-Chih Hsu et al.

It is certified that error appears in the above-identified patent and that said Letters Patent is hereby corrected as shown below:

<u>Title page,</u>
Item [75], Inventors, please correct the name of the inventor from "Shun-Te Chang" to -- Shun Te Cheng --

Signed and Sealed this

Second Day of November, 2004

JON W. DUDAS
*Director of the United States Patent and Trademark Office*